United States Patent [19]

Wu et al.

[11] Patent Number: 5,565,890
[45] Date of Patent: Oct. 15, 1996

[54] CURSOR CONTROL DEVICE

[75] Inventors: Arthur Wu; Amy Lee, both of Taipei Hsien, Taiwan

[73] Assignee: Primax Electronics, Ltd., Taipei Hsien, Taiwan

[21] Appl. No.: 428,029

[22] Filed: Apr. 25, 1995

[51] Int. Cl.$^6$ .................................................. G09G 3/02
[52] U.S. Cl. ...................................... 345/165; 345/167
[58] Field of Search ..................................... 345/163, 164, 345/165, 166, 167, 168, 156; 273/148 B; 74/471 XY; 178/18, 19; 341/22

[56] References Cited

U.S. PATENT DOCUMENTS

| | | | |
|---|---|---|---|
| 5,298,916 | 3/1994 | Sato et al. | 345/167 |
| 5,457,479 | 10/1995 | Cheng | 345/163 |

Primary Examiner—Kee M. Tung
Assistant Examiner—Doon Chow
Attorney, Agent, or Firm—Knobbe, Martens, Olson & Bear

[57] ABSTRACT

The present invention is related to a cursor control device which includes a ball housing for accommodating therein a ball, a grid wheel device driven by the ball for intermittently passing therethrough a light to control a movement of a cursor, a wheel shaft device engaged with the grid wheel device and driven by the ball for transmitting the grid wheel, and an urging device engaged with the wheel shaft device for urging the wheel shaft device against the ball to assure that the grid wheel device can rotate synchronously with the ball. The present invention utilizes the urging device to exert a force on the wheel shaft device so that the transmission roller device can be urged against the ball to facilitate the close contact between the transmission roller device and the ball rather than be passively contacted by the ball.

15 Claims, 6 Drawing Sheets

5,565,890

CURSOR CONTROL DEVICE

FIELD OF THE INVENTION

The present invention is related to a control device, and particular to a cursor control device.

BACKGROUND OF THE INVENTION

FIG. 1A is a schematic diagram of the main structure of a conventional cursor control device. The cursor control device shown in FIG. 1A includes a ball housing 1, an X-direction and a Y-direction grid wheels 2, an X-direction and a Y-direction transmission rollers 3, an X-direction and a Y-direction light-shielding plates 4, a Z-direction urging device 5 and a ball 6, wherein the Z-direction urging device 5 further includes a Z-direction recess 51, a spring 52 and a roller 53, as shown in FIG. 1B. The conventional cursor control device utilizes the urging device 5 installed in the Z direction to improve the precision of the shift detection. The spring 52 urges the roller 53 against the ball 6 so that the ball 6 is further urged against the X-direction and Y-direction transmission rollers 3. Accordingly, the X-direction and Y-direction transmission rollers 3 can be in close contact with the ball 6 to synchronously rotate with the ball 6.

However, if the ball 6 is urged against the transmission rollers 3 only by the urging device 5, the close contact situation between the ball 6 and the transmission rollers 3 may be destroyed easily. For example, if the cursor control device is accelerated to have the ball 6 acceleratively move in a direction away frown the Z-direction urging device 5, the ball 6 may press the urging device 5 and become out of contact with the transmission rollers 3 because of inertia. On the other hand, a relatively great frictional force may also result in this defect. Accordingly, the rotation of the ball 6 cannot drive the transmission rollers 3 and further the grid wheels 2 so that the shift detection will be adversely influenced.

In addition, the only urging force exerted on the ball 6 is the elastic force of the spring 52. When the urging force is greater than the elastic limit of the spring 52 or the spring 52 becomes elastically fatigued due to a long duration of use, the close contact situation between the ball 6 and the transmission rollers 3 may also be changed.

SUMMARY OF THE INVENTION

An object of the present invention is to provide a cursor control device in which a ball is in close contact with a transmission roller device almost all the time to avoid shift-detection error.

A cursor control device according to the present invention includes a ball housing for accommodating therein a ball, a grid wheel device driven by the ball for intermittently passing therethrough a light to control a movement of a cursor, a wheel shaft device engaged with the grid wheel device and driven by the ball for transmitting the grid wheel, and an urging means engaged with the wheel shaft device for urging the wheel shaft device against the ball to assure that the grid wheel device can rotate synchronously with the ball. The cursor control device preferably further includes a Z-direction positioning device engaged with the ball housing for rotatably confining the ball in the ball housing. The Z-direction positioning device includes a positioning recess and a positioning roller accommodated in the recess. The grid wheel device includes an X-direction grid wheel and a Y-direction grid wheel for controlling the movement of the cursor respectively in X-direction and Y-direction. The wheel shaft device includes an X-direction wheel shaft and a Y-direction wheel shaft respectively for the X-direction and Y-direction grid wheels.

In accordance with the present invention, the cursor control device preferably further includes a transmission roller device including an X-direction transmission roller and a Y-direction transmission roller respectively sleeved around or coaxially connected to the X-direction and Y-direction wheel shafts, driven by the ball, and transmitting the X-direction and Y-direction wheel shafts for enabling a rotation of the X-direction and Y-direction grid wheels. The urging means includes an X-direction urging device and a Y-direction urging device for urging the X-direction and Y-direction wheel shafts, respectively, against the ball. Each of the X-direction and Y-direction urging devices includes a recess, a connection device mounted in the recess and having a connection hole connecting thereto a corresponding one of the wheel shafts, and a spring mounted between an interior wall of the recess and the connection device for facilitating the transmission roller to be in close contact with the ball. The ball housing, the recess of each of the X-direction and Y-direction urging devices and the Z-direction positioning device can be integrally formed. The cursor control device preferably further includes an X-direction and a Y-direction light-shielding plates respectively mounted alongside the X-direction and Y-direction grid wheels. Each of the X-direction and a Y-direction light-shielding plates, the ball housing, the recess of each of the X-direction and Y-direction urging devices and the Z-direction positioning device can be integrally formed.

In accordance with another aspect of the present invention, the urging means includes a positioning post, and a torsional spring spirally sleeved around the positioning post and having two ends thereof respectively urging against the X-direction and Y-direction wheel shafts. The cursor control device preferably further includes a bottom shell which can be integrally formed with the ball housing, the positioning post, and the Z-direction positioning device. The cursor control device can also include an X-direction brace and a Y-direction brace for respectively supporting the X-direction and Y-direction wheel shafts. The ball housing, the positioning post, the Z-direction positioning device, the bottom shell and the X-direction and Y-direction braces can be integrally formed. On the other hand, the cursor control device preferably further includes an X-direction and a Y-direction light-shielding plates respectively mounted alongside the X-direction and Y-direction grid wheels. Each of the X-direction and Y-direction light-shielding plates has a hole for inserting thereinto a corresponding one of the X-direction and Y-direction wheel shafts.

The cursor control device can be a mouse or a track ball.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
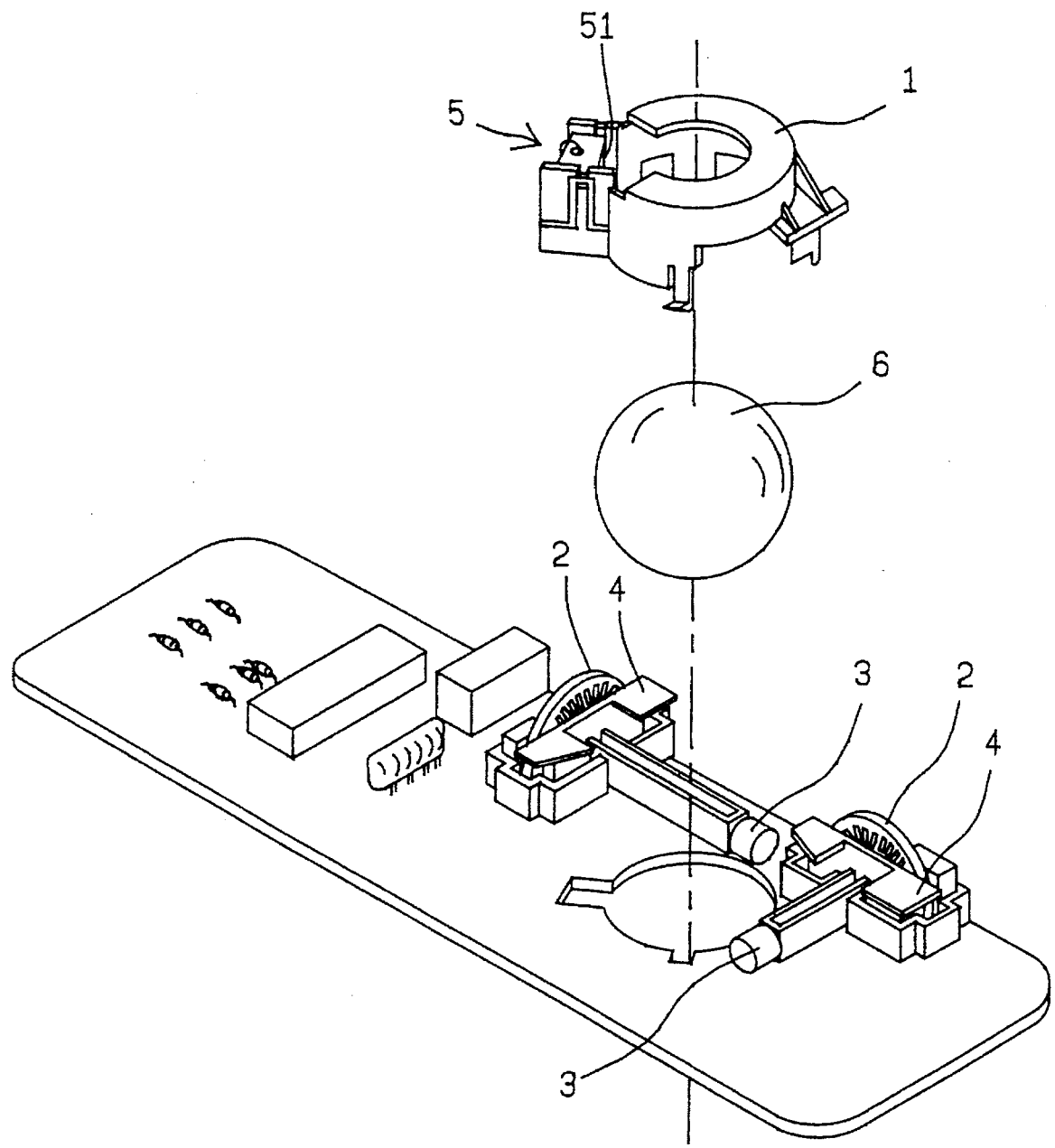
FIG. 1A is a schematic view showing the structure of a conventional cursor control device.
Figure 1B:
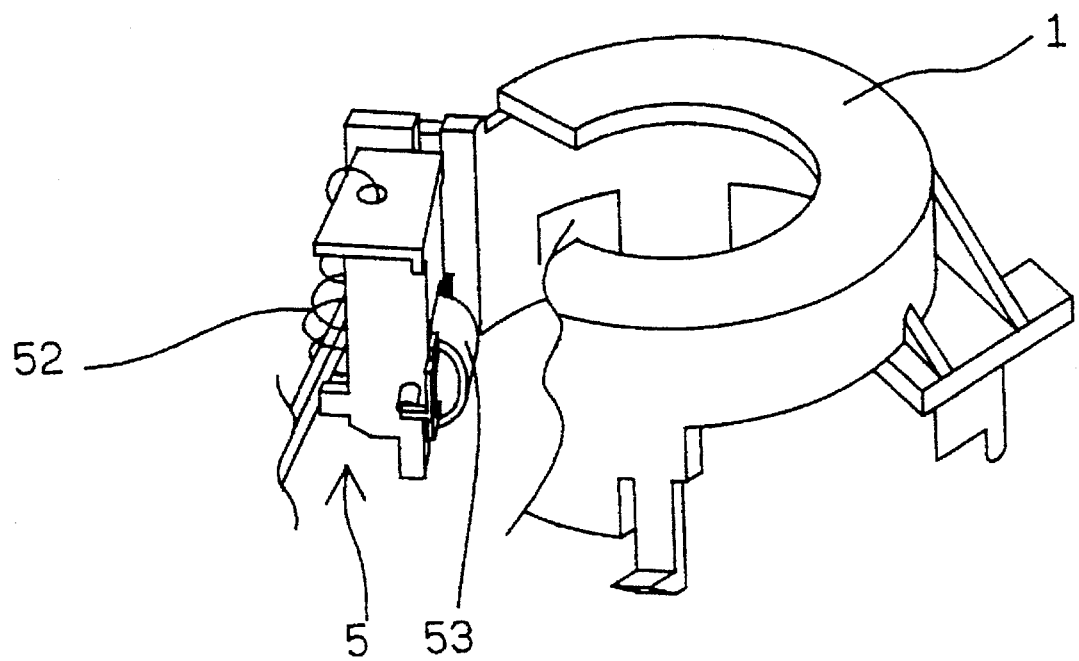
FIG. 1B is a schematic view showing a part of the cursor control device shown in FIG. 1A.
Figure 2A:
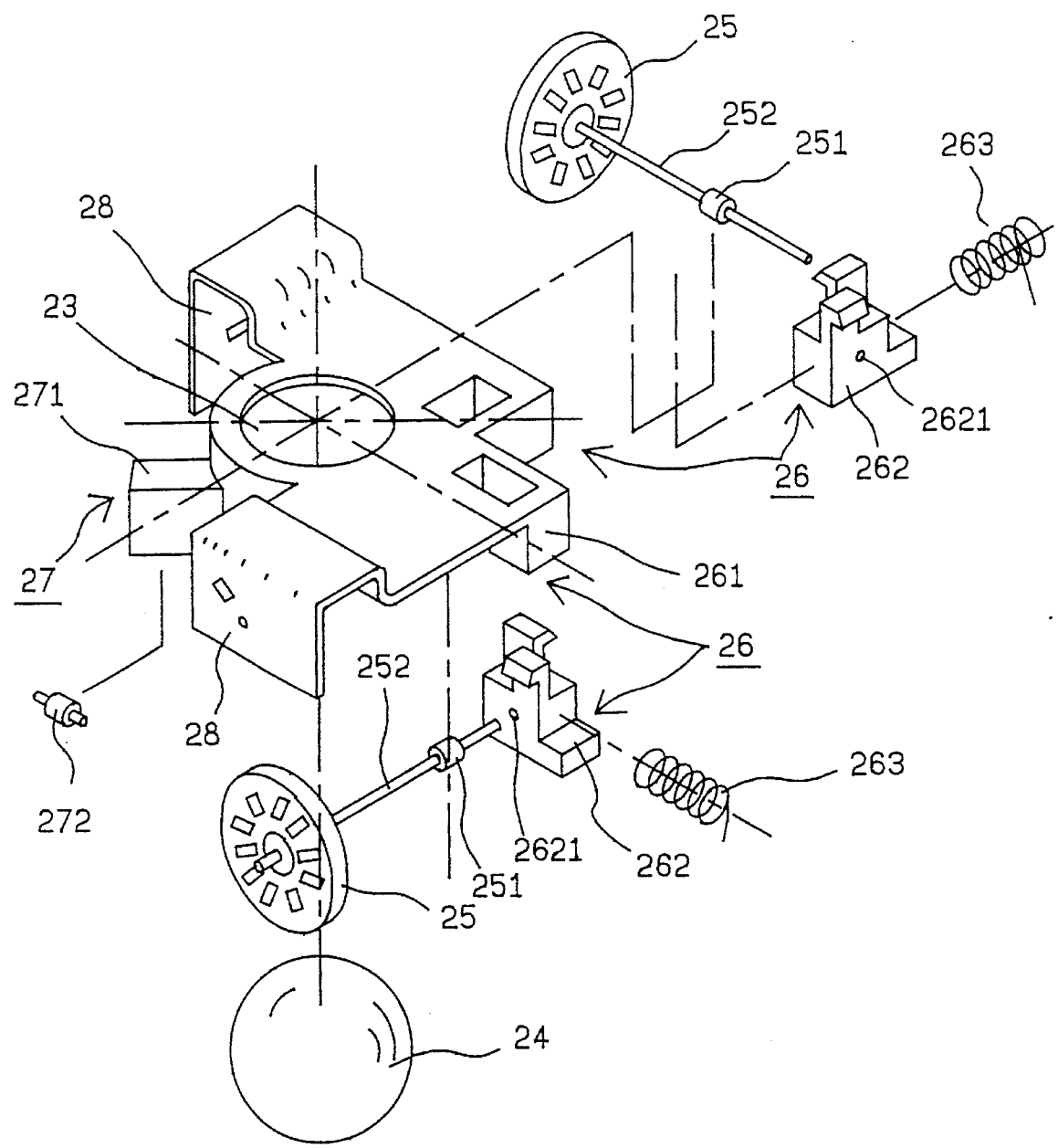
FIG. 2A is an exploded view schematically showing a first preferred embodiment of a cursor control device according to the present invention.
Figure 2B:
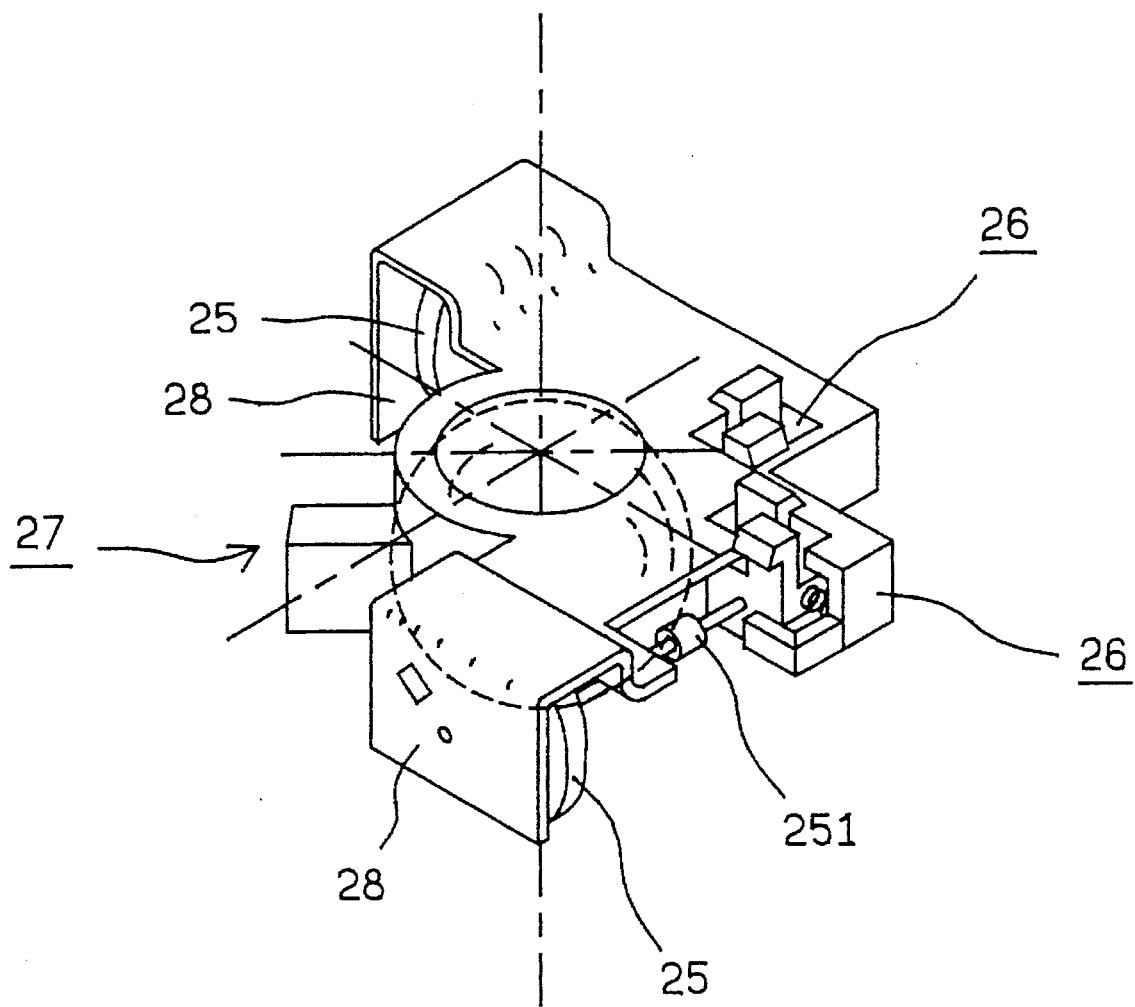
FIG. 2B is a prespective view schematically showing the first preferred embodiment of the cursor control device shown in FIG. 2A.

Please refer to FIGS. 2A and 2B which are respectively exploded and assembled views schematically showing a first preferred embodiment of a cursor control device according to the present invention. The cursor control device includes a ball housing 23, a ball 24, a grid wheel device 25 including an X-direction and a Y-direction grid wheels, a transmission roller device 251 including an X-direction and a Y-direction transmission rollers, a wheel shafts device 252 including an X-direction and a Y-direction wheel shafts, an urging means 26 including an X-direction and a Y-direction urging devices, a Z-direction positioning device 27 and an X-direction and a Y-direction light-shielding devices 28. In this case, the X-direction and Y-direction transmission rollers 251 are respectively sleeved around the X-direction and Y-direction wheel shafts 252; each of the X-direction and Y-direction urging devices 26 includes a recess 261, a connection device 262 having a connection hole 2621 and a spring 263; and the Z-direction positioning device 27 includes a positioning recess 271 and a roller 272. The wheel shafts 252 are inserted into the hole 2621 of the connection device 262 to be supported thereby, and the connection device 262 is mounted in the recess 261. The ball 24 is confined in the ball housing 23 by the transmission rollers 251 and the roller 272 of the Z-direction positioning device 27. The rotation of the ball 24 enables the rotation of the transmission rollers 251 and the wheel shafts 252, and further drives the grid wheels 25 to control the movement of a cursor. The present invention utilizes the installation of the urging devices 26 to improve the close contact degree between the transmission rollers 251 and the ball 24 by urging the transmission rollers 251 against the ball 24 by the elastic force of the spring 263 which is mounted between an interior wall of the recess 261 and the connection device 262.

Figure 3A:
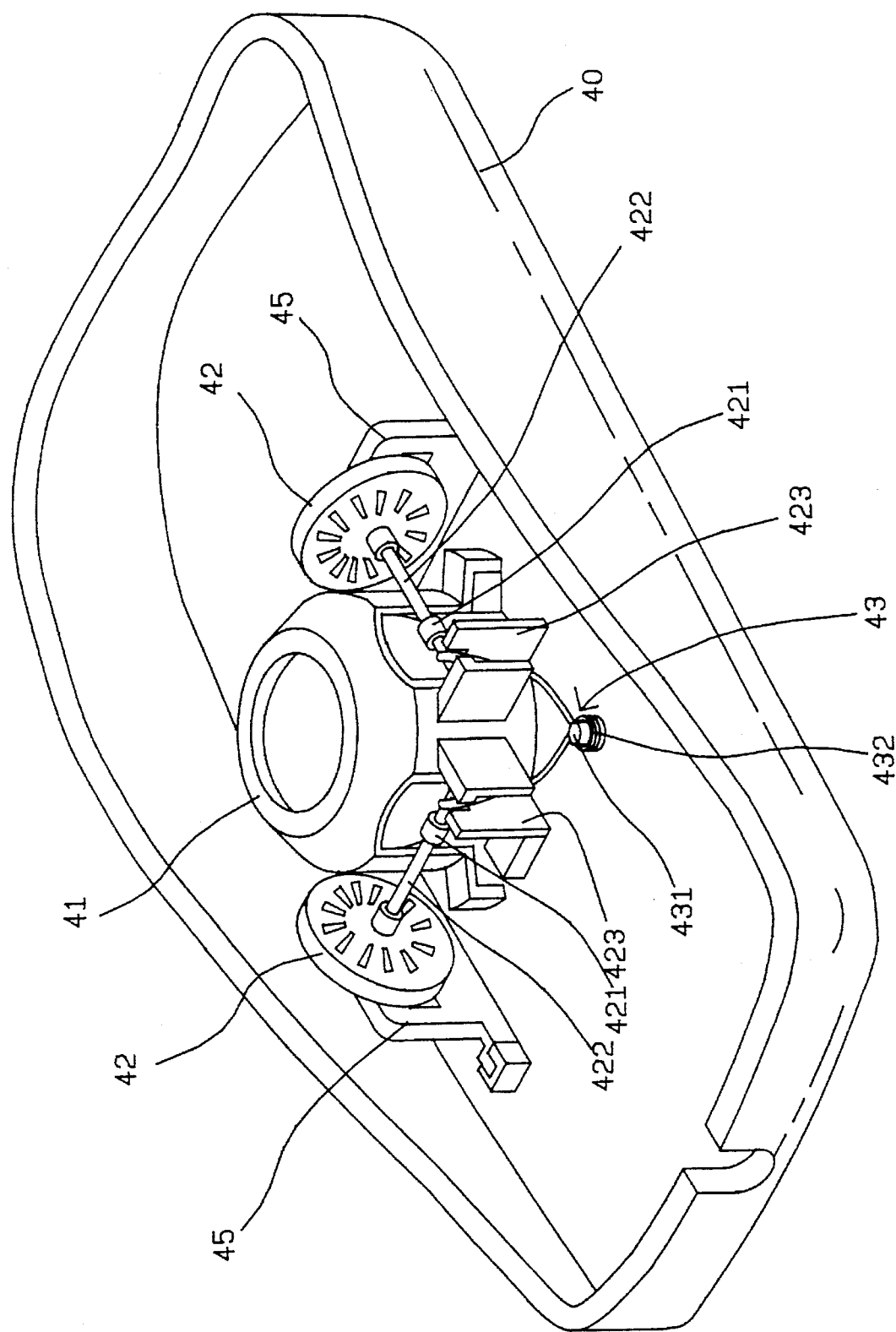
FIG. 3A is a prespective view schematically showing a second preferred embodiment of a cursor control device according to the present invention.
Figure 3B:
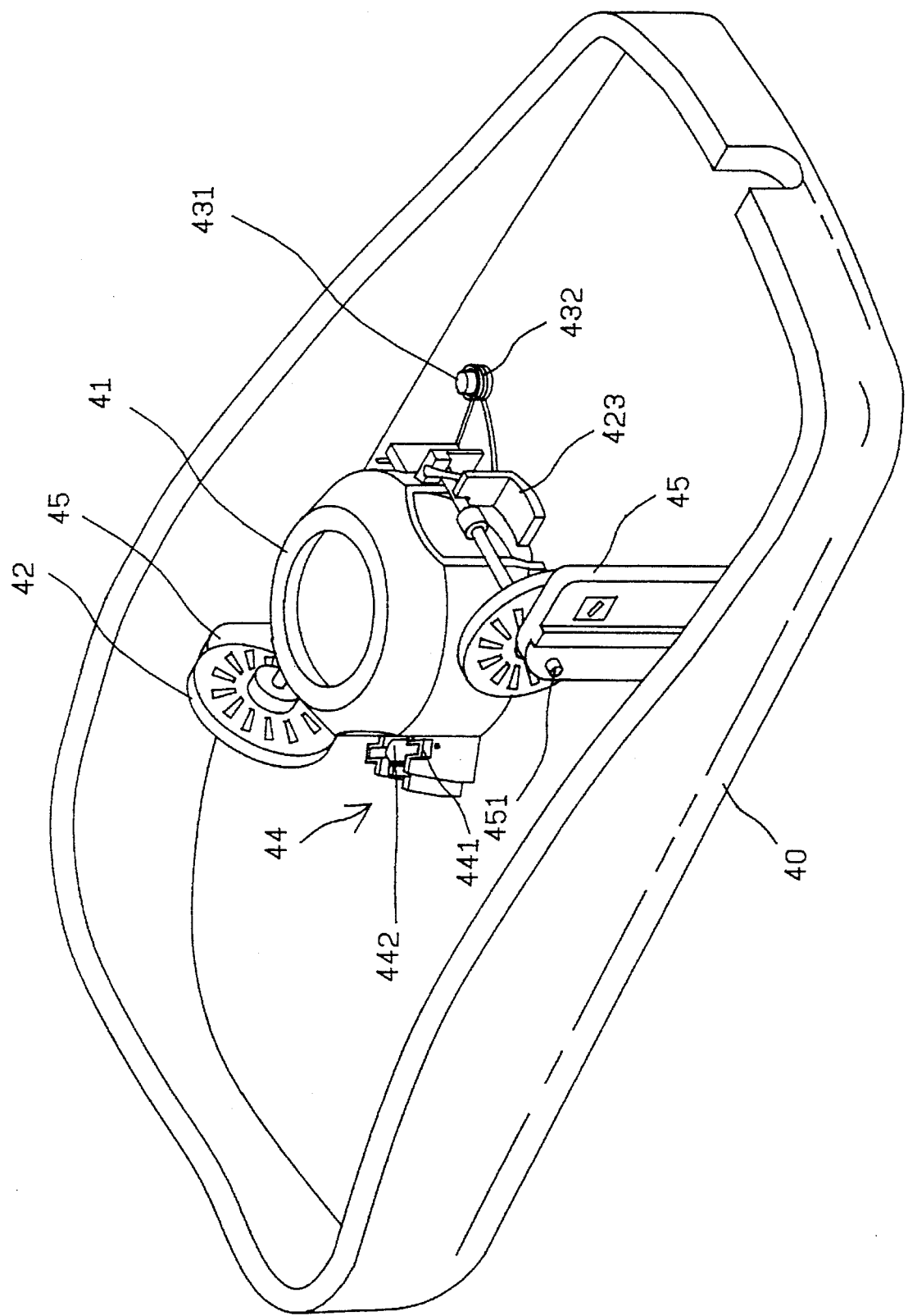
FIG. 3B is a further perspective view schematically showing the second preferred embodiment of the cursor control device shown in FIG. 3A.

Please refer to FIGS. 3A and 3B which are prespective views schematically showing a second preferred embodiment of a cursor control device according to the present invention. The cursor control device includes a bottom shell 40, a ball housing 41, a ball (not shown), a grid wheel device 42 including an X-direction and a Y-direction grid wheels, a transmission roller device 421 including an X-direction and a Y-direction transmission rollers, a wheel shaft device 422 including an X-direction and a Y-direction wheel shafts, an X-direction and a Y-direction braces 423 for supporting the wheel shafts 422, an urging means 43, a Z-direction positioning device 44 and an X-direction and a Y-direction light-shielding devices 45. In this case, the Z-direction positioning device 44 includes a positioning recess 441 and a roller 442; the urging means 43 includes a post 431 and a torsional spring 432 spirally sleeved around the post 431; and the light-shielding plates 45 have holes for inserting therein the wheel shafts 422. Two ends of the torsional spring 432 respectively extend to the X-direction and Y-direction wheel shafts 422 for urging the wheel shafts and in turn the transmission rollers 421 against the ball to facilitate the close contact between the transmission rollers 421 and the ball to assure that the transmission rollers 421 can synchronously rotate with the ball.

Concerning the cursor control principle, it is not to be described here because it is well known to those skilled in the art.

To sum up, the present invention utilizes the urging means, in stead of the spring of the Z-direction positioning device, to exert a force on the wheel shaft device so that the transmission roller device can be urged against the ball to facilitate the close contact between the transmission roller device and the ball rather than be passively contacted by the ball. Therefore, the contact condition between the ball and the transmission roller device in the present invention is closer than that in the conventional cursor control device.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cursor control device, comprising:

a ball housing for accommodating therein a ball;

a grid wheel device driven by said ball for intermittently passing therethrough a light to control a movement of a cursor;

a wheel shaft device engaged with said grid wheel device and driven by said ball; and an urging device including a recess, a connection device mounted in said recess, and a spring mounted between an interior wall of said recess and said connection device for facilitating said wheel shaft device to be in close contact with said ball, wherein said urging device is engaged with said wheel shaft device for urging said wheel shaft device against said ball to assure that said grid wheel device can rotate synchronously with said ball.

2. A cursor control device according to claim 1 further comprising a Z-direction positioning device engaged with said ball housing for rotatably confining said ball in said ball housing.

3. A cursor control device according to claim 2 wherein said Z-direction positioning device includes a positioning recess and a positioning roller accommodated in said recess.

4. A cursor control device according to claim 1 wherein said grid wheel device includes an X-direction grid wheel and a Y-direction grid wheel for controlling said movement of said cursor respectively in X-direction and Y-direction.

5. A cursor control device according to claim 4 wherein said wheel shaft device includes an X-direction wheel shaft and a Y-direction wheel shaft respectively for said X-direction and Y-direction grid wheels.

6. A cursor control device according to claim 5 wherein said wheel shaft device further includes a transmission roller device comprising an X-direction transmission roller and a Y-direction transmission roller respectively sleeved around said X-direction and Y-direction wheel shafts, wherein said X-direction transmission roller and said Y-direction transmission roller are driven by said ball and transmit rotation of said X-direction and Y-direction wheel shafts for enabling rotation of said X-direction and Y-direction grid wheels.

7. A cursor control device according to claim 6 wherein said X-direction transmission roller and said Y-direction transmission roller are respectively coaxially connected to said X-direction and Y-direction wheel shafts.

8. A cursor control device according to claim 7 wherein said urging device further comprises an X-direction urging device and a Y-direction urging device for urging said X-direction and Y-direction wheel shafts, respectively, against said ball.

9. A cursor control device according to claim 8 wherein each of said X-direction and Y-direction urging devices includes a connection hole in each of said connection devices of said X-direction and said Y-direction urging devices connecting thereto a corresponding one of said wheel shafts.

10. A cursor control device according to claim 9 wherein said ball housing, said recess of each of said X-direction and Y-direction urging devices and said Z-direction positioning device are integrally formed.

11. A cursor control device according to claim 9 further comprising an X-direction and a Y-direction light-shielding plates respectively mounted alongside said X-direction and Y-direction grid wheels.

12. A cursor control device according to claim 11 wherein each of said X-direction and a Y-direction light-shielding plates, said ball housing, said recess of each of said X-direction and Y-direction urging devices and said Z-direction positioning device are integrally formed.

13. A cursor control device according to claim 11 wherein each of said X-direction and Y-direction light-shielding plates has a hole for inserting thereinto a corresponding one of said X-direction and Y-direction wheel shafts.

14. A cursor control device according to claim 1 wherein said cursor control device is a mouse.

15. A cursor control device according to claim 1 wherein said cursor control device is a track ball.

* * * * *